US007829271B2

(12) United States Patent
Delattre et al.

(10) Patent No.: US 7,829,271 B2
(45) Date of Patent: Nov. 9, 2010

(54) PROCESS FOR DISTRIBUTING DROPS OF A LIQUID OF INTEREST ONTO A SURFACE

(75) Inventors: Cyril Delattre, Izeaux (FR); Gilles Marchand, Pierre Chatel (FR); Patrick Pouteau, Meylan (FR); Frédéric Ginot, Saint-Egreve (FR)

(73) Assignees: Commissariat a l'Energie Atomique, Paris (FR); Biomerieux SA, Macry l'Etoile (FR)

( * ) Notice: Subject to any disclaimer, the term of this patent is extended or adjusted under 35 U.S.C. 154(b) by 496 days.

(21) Appl. No.: 10/576,342

(22) PCT Filed: Oct. 21, 2004

(86) PCT No.: PCT/FR2004/050527

§ 371 (c)(1),
(2), (4) Date: Dec. 28, 2006

(87) PCT Pub. No.: WO2005/042164

PCT Pub. Date: May 12, 2005

(65) Prior Publication Data

US 2007/0218452 A1    Sep. 20, 2007

(30) Foreign Application Priority Data

Oct. 31, 2003    (FR)    ................... 03 50763

(51) Int. Cl.
*C12Q 1/00*    (2006.01)
(52) U.S. Cl. .......................................................... 435/4
(58) Field of Classification Search ...................... 435/4, 435/6, 7.1, 7.92, 287.2–287.3, 287.9, 288.4
See application file for complete search history.

(56) References Cited

U.S. PATENT DOCUMENTS

| 5,458,852 | A | * | 10/1995 | Buechler | ..................... 422/58 |
| 5,474,796 | A | * | 12/1995 | Brennan | ................... 427/2.13 |
| 5,810,989 | A | * | 9/1998 | Krihak et al. | ................. 205/91 |
| 6,040,193 | A | | 3/2000 | Winkler et al. | |
| 6,143,496 | A | | 11/2000 | Brown et al. | |
| 6,210,894 | B1 | | 4/2001 | Brennan | |
| 6,565,813 | B1 | | 5/2003 | Garyantes | |
| 6,642,061 | B2 | * | 11/2003 | Ellson et al. | ................. 436/180 |
| 6,911,132 | B2 | * | 6/2005 | Pamula et al. | ................. 204/600 |
| 7,008,788 | B2 | * | 3/2006 | Schremp et al. | .......... 435/287.1 |
| 2002/0094528 | A1 | * | 7/2002 | Salafsky | ........................ 435/6 |
| 2003/0194709 | A1 | * | 10/2003 | Yang | ............................. 435/6 |

FOREIGN PATENT DOCUMENTS

| JP | 2002-504677 | 2/2002 |
| WO | WO 99/03684 | 1/1999 |
| WO | WO 99/42805 | 8/1999 |
| WO | WO 00/36145 | 6/2000 |
| WO | WO 02/16023 A2 | 2/2002 |
| WO | WO 02/41992 A2 | 5/2002 |
| WO | WO 02/090573 A2 | 11/2002 |
| WO | WO 03/059518 A1 | 7/2003 |

OTHER PUBLICATIONS

Lee, Junghoon, et al., Electrowetting and Electrowetting-On-Dielectric for Microscale Liquid Handling, *Sensors and Actuators A* 95 (2002), pp. 259-268.
Bratten, Craig D. T., et al., Micromachining Sensors for Electrochemical Measurement in Subnanoliter Volumes, *Anal. Chem. 1997*, 69, pp. 253-258.
Yang, Mengsu, et al. Covalent Immobilization of Oligonucleotides on Modified Glass/Silicon Surfaces for Solid-Phase DNA Hybridization and Amplification, *Chemistry Letters 1998*, pp. 257-258.
Boncheva, Mila, et al., Design of Oligonucleotide Arrays at Interfaces, *Langmuir 1999*, 15, pp. 4317-4320.
Jansen, Henri, et al., The Black Silicon Method: A Universal Method for Determining the Parameter Setting of a Fluorine-Based Reactive Ion Etcher In Deep Silicon Trench Etching With Profile Control, *J. Micromech, Microeng*, 5 (1995) pp. 115-120.
Azek, F., et al., Hybridization Assay at a Disposable Electrochemical Biosensor for the Attomole Detection of Amplified Human Cytomegalovirus DNA, Analytical Biochemistry 284, 2000, pp. 107-113.
Lee, J., et al., Electrowetting and electrowetting-on-dielectric for microscale liquid handling, Sensors and Actuators A 95, 2002, pp. 259-268.
Bratten, C.D., et al., Micromachining Sensors for Electrochemical Measurement in Subnanoliter Volumes, Analytical Chemistry, vol. 69, No. 2, 1997, pp. 253-258.
Yang, M., et al., Covalent Immobilization of Oligonucleotides on Modified Glass/Silicon Surfaces for Solid-phase DNA Hybridization and Amplification, The Chemical Society of Japan, 1998, pp. 257-258.
Boncheva, M., et al., Design of Oligonecleotide Arrays at Interfaces; American Chemical Society, 1999 pp. 4317-4320.
Jansen, H., et al., The black silicon method: a universal method for determining the parameter setting of a fluorine-based reactive ion etcher in deep silicon trench etching with profile control, J. Micromech. Microeng. 5, 1995, pp. 115-120.

* cited by examiner

*Primary Examiner*—Ann Y Lam
(74) *Attorney, Agent, or Firm*—McKenna Long & Aldridge LLP (57) ABSTRACT

The present invention relates especially to a process for the localized distribution of drops of a liquid of interest on an active surface. The process comprises the following steps: an introduction of liquid of interest into a box containing the said active surface, and an extraction of liquid of interest from the said box, the said active surface and also the other surfaces inside the box being substantially non-wetting with respect to the liquid of interest, with the exception of several uptake areas localized on the said active surface, which are each suitable for taking up a drop of liquid of interest. The uptake areas may surround working areas. The present invention also relates to processes for the electrochemical and optical detection of at least one analyte in a liquid of interest, and to an electropolymerization process.

27 Claims, 5 Drawing Sheets

PROCESS FOR DISTRIBUTING DROPS OF A LIQUID OF INTEREST ONTO A SURFACE

This application claims priority to International Application No. PCT/FR2004/050527, filed on Oct. 21, 2004, and French Patent Application No. 03-50763, filed Oct. 31, 2003, all of which are hereby incorporated by reference in their entirety

TECHNICAL FIELD

The present invention relates to a process for the localized distribution of drops of a liquid of interest onto an active surface, and to the use of this process in a lab-on-chip or in a microsystem for chemistry or biology. The present invention also relates to processes for the electrical, electrochemical, chemical and optical detection of at least one compound that may be present in a drop of a liquid of interest, and to a process for the electropolymerization of molecules present in a liquid of interest.

The present invention allows the production of a matrix of localized drops, at high density, on a surface, using a liquid of interest. It allows easy transition from a fluid chamber, known as a box, filled with a liquid of interest having a matrix of drops, or microvolumes, perfectly localized on a surface placed in the said fluid chamber, when the liquid of interest is evacuated from the said fluid chamber.

The term "drop matrix" means a given arrangement of the said drops, without a particular geometrical form of the said arrangement being stipulated. The drop matrix may be round, square, polygonal or even random, the essential being that the drops formed are arranged in a localized and given manner on the surface in accordance with the objective achieved by the present invention. The term "localized" means circumscribed, individualized and separate from the other drops deliberately taken up on the said surface by means of the process of the invention.

Each of the drops may be subjected to one or more operations intended to qualitatively and/or quantitatively analyse one or more analyte(s) that are present or that may be present in the liquid of interest, for example a molecule, an oligonucleotide, a protein, etc. The analysis of the analytes in the drop may be performed via any technique known to those skilled in the art for performing analyses, in particular a volume of liquid as small as a drop. They may be analysis techniques used on biological chips. The analysis may or may not involve the surface of the device of the invention covered with the drop, according to the embodiment of the present invention.

Each of the drops forms a volume in which chemical or biochemical reactions may be performed. Any chemical or biochemical reaction known to those skilled in the art may be performed in this volume. These reactions may or may not involve the surface of the device of the invention covered with the drop, according to the embodiment of the present invention. When these reactions involve the surface of the device of the invention covered with the drop, they may do so with only one drop or several drops successively deposited on this surface, these successive drops consisting of one or more different liquids of interest according to the embodiment of the present invention. An example of chemical reactions involving, for example, two different liquids of interest on a device of the invention is the following: by means of a drop of a first liquid of interest, localized deposition of a film of an organic polymer onto the surface covered with this drop, and then, by means of a drop of a second liquid of interest, functionalization of the organic polymer film deposited on this surface.

According to the present invention, one or more analyses and one or more chemical/biochemical reactions may be exclusively performed on a device in accordance with the present invention (analysis or reaction), or in a complementary manner. In the latter case, they may be performed simultaneously (reaction and analysis) or successively (reaction followed by analysis, or analysis followed by reaction). In addition, several analyses and/or several reactions may be performed in succession. For example, the device of the present invention may advantageously participate, on the one hand, in the manufacture of a card, or lab-on-chip (for example via chemical reactions for depositing a polymer and then for functionalizing it), in which all the steps required for the qualitative and quantitative analyses of a liquid of interest are integrated: manipulation of fluid, chemical and/or biochemical reactions, optical, electrical and/or chemical detection chip, etc.; and, on the other hand, in the use of this card, or lab-on-chip, to perform qualitative and/or quantitative analyses in drops of a liquid of interest to be analysed (chemical/biochemical reaction(s) and analysis).

In the present description, the references in parentheses [ ] refer to the appended list of references.

PRIOR ART

According to the envisaged applications, this invention is similar to the general field of formation of drops, of working in microvolume(s), and of matrices with a high density of drops.

The formation of localized areas to isolate a liquid phase is widespread in the field of biological chips, and especially of DNA chips. For these applications, the reaction volume is often very small to economize the biological products and the reagents.

For the formation of localized drops and of matrices with a high density of drops, the companies Protogene Laboratories Inc. [1] and Affymetrix Inc. [2] use a technique using an automated dispensing system. These systems lead to the formation of drops and of matrices with a high density of points or drops on a surface.

However, besides the drop dispensing system, these techniques all require the use of a device for the displacement and the precise alignment of this system, and also a device for feeding with liquid. This apparatus is expensive. In addition, the maximum density of the drop matrices that may be formed is limited by a combination between the size of the dispensed drops and the minimum inter-point interval of the dispensing system.

For the formation of matrices with a high density of microcuvettes, two families of significant processes may be mentioned: the family of processes using the formation of a network of cuvettes micro-manufactured by etching on a silicon wafer to perform DNA amplifications by PCR in microvolumes of a few picoliters, and the family of processes using the formation of wells or channels by photolithography on photosensitive resins deposited on a plastic substrate [3]. With these techniques, the number of wells ranges from 100 to 9600 wells, with diameters from 60 to 500 μm and depths from 5 to 300 μm.

However, the edges of these cuvettes do not leave any physical separation between the liquid phase inside the cuvette and that outside it, thus allowing connections between the cuvettes, and thus contaminations between them. In addition, these devices require, in order to be used, drop dispensing systems, a device for the displacement and precise alignment of this system, and also a device for feeding with liquid. The same drawbacks and problems as those mentioned above are thus encountered.

For electrical or electrochemical detection in biological tests, a large number of electrical or electrochemical detection systems described in the literature do not make it possible to go below the nanomolar level in terms of detection limit, this limitation often being due to the small number of electrons generated by each hybrid.

The techniques involving an enzymatic accumulation allow this detection limit to be lowered to about the picomolar level by means of the high amplification of the number of redox species to be detected present in the reaction medium [4]. However, this amplification method gives rise to a problem for the currently known multipoint systems since the redox compound diffuses and can thus contaminate the neighbouring points.

With this aim, in the majority of cases, the use of three-dimensional structures (use of compartments) is recommended in the literature. For example, Infineon [6] proposes polymer walls and a system of molecule migration via electrical forces, so as to confine them in a defined volume and thus to avoid inter-point contamination. Unfortunately, problems of fluid filling may be encountered with this type of approach when it is desired, for example, to work in a very fine liquid vein. In this case also, a drop dispenser becomes essential.

There is thus a real need for a process for easily obtaining a high-density drop matrix using a liquid of interest, which may be used without any drop dispensing apparatus, which is easy to use, which can efficiently avoid contaminations between the drops, and which may be used very flexibly with all the processes currently known to those skilled in the art for the collective or individual analysis of microvolumes, for example on a lab-on-chip, whether it is a matter of a chemical, electrical or optical process or a combination of these processes.

DESCRIPTION OF THE INVENTION

The present invention precisely satisfies this need, and also others, outlined below, by providing a process for the localized distribution of drops of a liquid of interest on an active surface of a substrate, the said process comprising the following steps:

introduction of the liquid of interest into a box via introduction means, the said box enclosing the said active surface, and extraction of the liquid of interest from the said box via extraction means, the said active surface and also the other surfaces inside the box being substantially non-wetting with respect to the liquid of interest with the exception of several localized uptake (capture) areas, formed in a given (determined) manner on the said active surface, which are each suitable for taking up (capturing) a drop of the liquid of interest, the said means for introducing and for extracting the liquid of interest in the box being arranged such that when the liquid of interest is introduced into the box, it covers the said uptake areas, and when the liquid of interest is extracted from the box, a drop of the said liquid of interest remains captive in a distributed and localized manner on each uptake area.

In the context of the present invention, a liquid is said to be "of interest" when this liquid is intended to be taken up by uptake areas in a process in accordance with the invention, to form a matrix of drops of this liquid.

The term "liquid of interest" means any liquid liable to require an arrangement as a drop matrix on a support, for example for analytical and/or chemical and/or biochemical purposes. The term "chemical and/or biochemical purposes" means any chemical and/or biochemical reaction that may be performed in a liquid. The term "analytical purposes" means any qualitative and/or quantitative analysis that may be performed in a liquid.

The liquid of interest may be organic or aqueous. It may be any of the liquids currently handled in a laboratory or in industry, for example on lab-on-chips. It may be, for example, a liquid chosen from a solution, a solvent, a reagent, a sample, a cell extract, a specimen taken from an animal or plant organism, a specimen taken from nature or in industry, etc. It may be a biological or chemical liquid, for example a solution in which a biological recognition (for example protein/protein; hybridization of nucleic acids; antigen/antibody, etc.) must be performed and/or detected. This liquid of interest may be a liquid that is diluted, if necessary, for its use with the device of the present invention, as may be performed on lab-on-chips. A solid product may be dissolved to constitute a liquid of interest within the meaning of the present invention. This solid product may be chosen, for example, from a chemical or biochemical product, a reagent, a material to be analysed, a specimen taken from an animal or plant organism, a specimen taken from nature or in industry, etc. A person skilled in the art knows how to handle such products and liquids of interest.

In general, the process of the invention may be used in a lab-on-chip, in a chemical or biological microsystem, such as an analytical microsystem, or in a biochip, chosen, for example, from the group consisting of DNA (deoxyribonucleic acid) or RNA (ribonucleic acid) chips, protein chips, antibody chips, antigen chips, cell chips, etc.

The process of the invention uses a box. This box may be open or closed. It may be used solely to obtain a localized distribution of drops of the liquid of interest on the active surface according to the process of the invention. It may also be used to confine the drops locally distributed on the active surface and/or to perform chemical or biochemical reactions and/or qualitative and/or quantitative analyses on or in these drops. The box may thus constitute a veritable miniature laboratory (lab-on-chip).

The dimensions of this box depend especially on the dimensions of the substrate comprising the active surface chosen for the implementation of the process of the invention, but also, where appropriate, on the presence of additional Microsystems or analytical devices that may be combined in the said box, for example other lab-on-chips, for the implementation of the process of the invention. These dimensions may go below the centimeter level for the longest side length of the box.

The box may consist, for example, of a material chosen from the group consisting of an organic polymer, an elastomeric plastic material, a glass, metal, silicon, a photosensitive resin, or of any material known to those skilled in the art and allowing the implementation of the present invention. For example, it may be a polymer chosen from the group comprising polycarbonates, polydimethylsiloxanes, polymethyl methacrylates, polychlorobiphenyls and cycloolefin copolymers.

The material of the box is generally chosen as a function of the type of liquid of interest to be distributed as drops, of the use of the box (simple immersion or immersion and analyses) and as a function of the manufacturer's cost specifications.

The boxes that may be used are preferably sufficiently leaktight to avoid, for example, leaks during the immersion therein of the active surface, contaminations that may originate from outside the box, for example bacterial, chemical, etc. contaminations, and evaporation of the drop(s) taken up by the uptake area(s) after extraction of the liquid of interest from the box.

The boxes that may be used may comprise a lid for mounting them, but also, in certain applications, for opening or closing them, in order especially to be able to be able to remove therefrom the substrate with its active surface after having placed it in contact with the liquid of interest and/or after the analyses or reactions in the drops. The box may then comprise removable means for attaching the substrate. If the box comprises a lid, it will preferably be sufficiently leaktight so as not to disrupt the immersion of the active surface.

The lid may consist of a material such as those mentioned above for the box. It may be manufactured, for example, by moulding, drawing, etching or mechanical erosion, etc. It may then be permanently attached to the box to close it, for example by bonding, compression, plating or any other means known to those skilled in the art and which ensures the behaviour and the leaktightness required for the use thereof. It may also be removably attached to the box, while still ensuring the behaviour and the leaktightness required for the use thereof, in order for the same box thus constituted to be able to serve for the successive immersion of different substrates with different active surfaces, to form several drop matrices.

Preferably, the material of the box and, where appropriate, of its lid, is, inside the said box, substantially non-wetting with respect to the liquid of interest. Specifically, this makes it possible to avoid drops from adhering to the inner surfaces of the box, after the extraction of the liquid of interest, and falling onto the active surface and interfering with the analyses and reactions on the drops locally distributed on the active surface. Surface treatments may be necessary to obtain this result, for instance those described below for the active surface.

The closed boxes that may be used comprise means for introducing and extracting the liquid of interest from the said box. There is no limitation in the position, the form and the function of these means other than those: this means should allow the introduction and then the extraction of the liquid of interest from the box; and they should be arranged such that when the liquid of interest is introduced into the box, it covers the uptake area(s), and when the liquid of interest is extracted from the box, a drop of liquid of interest remains captive by the uptake area. These means may comprise apertures formed on the box. These apertures may be arranged on the top or the sides of the lid or of the box, or alternatively through the substrate. The liquid of interest may enter and then leave the box via two different apertures, one aperture for the introduction of the liquid of interest into the box, and one aperture for extracting the liquid of interest from the box. The liquid of interest may also enter and then leave the box via only one of the two apertures, a second aperture serving to allow the extraction of the liquid of interest, either by allowing the passage of the air drawn by the extraction, or by injecting via this second aperture a gaseous fluid that allows the liquid of interest to be pushed out of the box. These apertures may be arranged on the lid or on the walls of the box, for example by etching, drawing, moulding, exposure to light for a photosensitive resin, mechanical piercing, etc.

The means for introducing the liquid of interest into the box may also comprise any suitable means known to those skilled in the art for injecting a liquid into a box, especially those used in the field of lab-on-chips and microsystems. It may be, for example, a syringe, a pipette, a micropipette, an injection pump, etc.

The means for extracting the liquid of interest from the box may be any suitable means known to those skilled in the art for extracting a liquid from a box. The essential is that the drop(s) taken up by the uptake area should not be entrained during the extraction of the liquid of interest. For example, the extraction means may comprise a pump for drawing the liquid of interest out of the box by suction: the extraction step then consists in drawing the liquid of interest from the said box by suction. For example also, the extraction means may comprise a pump for injecting a gaseous fluid into the box: the extraction step then consists in injecting a gaseous fluid into the box so as to expel the liquid of interest from the said box. Advantageously, the gaseous fluid injected may be saturated with vapour of the liquid of interest via any technique known to those skilled in the art. In addition, generally, the apertures or connections of the box to the exterior may advantageously be connected to reserves of gas saturated with vapour of the liquid phase of interest, which has the advantage of avoiding the evaporation of the drops once formed, in particular when the sizes of the box and of the substrate used are very small. The gas or the gaseous fluid may be air or a neutral gas, if necessary.

The substrate may consist of any material that is suitable for implementing the present invention. It may be, for example, one of the base materials used for the manufacture of lab-on-chips, biochips, microsystems, etc. It may be, for example, a material chosen from the group consisting of silicon, silicon oxide, silicon nitride, glass, an organic polymer, and a metal or a metal alloy. The organic polymers may be chosen, for example, from the group comprising polycarbonates, polydimethylsiloxanes, polymethyl methacrylates, polychlorobiphenyls and cycloolefin copolymers. The metal may be chosen, for example, from the group consisting of Au, Ti, Pt, Al and Ni, and the metal alloy may be stainless steel.

The substrate may constitute one of the walls of the box. The walls constituting the box may then be mounted using the substrate, for example by bonding or compression, provided that the active surface is in the box.

The active surface may consist of any material that is substantially non-wetting with respect to the liquid of interest and suitable for implementing the present invention. Specifically, the functioning of the process of the present invention is partly based on the fact that the active surface retains very little or none of the liquid of interest, which allows easy, total dewetting, without retention of liquid of interest on the surface, and without drying. Thus, the drops of liquid of interest are selectively and exclusively taken up by the uptake area(s), and are circumscribed to these areas, which avoids any problem of contamination between the drops taken up.

The material of the active surface is thus especially chosen as a function of the liquid of interest from which a drop matrix is to be formed, but also as a function of the substrate, of the uptake areas and, where appropriate, as a function of the working areas arranged with these uptake areas (the working areas are defined below). It may be arranged on the substrate by chemical modification or by deposition. It may also be the substrate itself if it consists of a material that is substantially non-wetting with respect to the liquid of interest.

For example, when the liquid of interest is aqueous, the material forming the active surface is advantageously hydrophobic. For example, in the examples of the abovementioned materials constituting the substrate, the surface of the substrate may be made non-wetting, in this case hydrophobic, by chemical modification, for example by silanization with a silane bearing hydrophobic functions, for example 1H, 1H, 2H, 2H-perfluorodecyltrichlorosilane. It may also be, for example, a deposition of liquid Teflon on a rotating plate; a gas-phase silanization of hydrophobic silane; the use of hydrocarbon-based silane, for example of the octadecyl-trichlorosilane type. The materials and processes that may be used to perform such chemical modifications are known to those skilled in the art. An implementation example is given below.

The treatment for making the surface of the substrate non-wetting with respect to the liquid of interest may be performed before or after the formation of the uptake area(s) and/or of the corresponding working area(s). The latter areas will optionally be protected when the treatment is performed after the formation of the said areas.

The form and size of this active surface, and thus also of the substrate on which it is formed, are irrelevant with regards the functioning of the process of the invention. They are generally determined as a function of the number of areas of drops of liquid of interest to be formed on this surface and of the cost specifications. However, in order to avoid unforeseen retention of liquid of interest on the surface, a flat surface is preferably chosen. For example, the active surface may have a form and a size comparable with the wafers used for the manufacture of lab-on-chips and the analysis and detection microsystems known to those skilled in the art.

The surface of the substrate used in the process of the invention (active surface) is modified (structuring) in order to create localized areas that are wetting with respect to the liquid of interest, i.e. which have high affinity for the liquid of interest, or on which the liquid may be retained by capillary forces. These areas are known as the "uptake areas". The term "localized" is defined above. By trickling a small amount of liquid of interest over the active surface, the uptake areas take up, or retain, a drop of liquid of interest, whereas the active surface, which is substantially non-wetting with respect to the liquid of interest, retains very little or no liquid of interest. On stopping the trickling, only the drops of liquid of interest locally retained by the uptake areas remain on the active surface.

A multitude of solutions may be envisaged for forming these uptake areas on the active surface of the substrate: chemical treatment of the surface to locally increase the affinity with the liquid, for example by grafting molecules with specific groups, localized electrowetting by means of micro-electrodes, microcuvettes formed by crowns in relief on the surface, deep-etched microcuvettes, etc. Specifically, the, at least one, uptake area may be an area for the chemical, electrical or physical uptake of a drop of liquid of interest. It may be any type of localized area that allows the uptake of a drop of liquid of interest by simple contact of this area with the liquid of interest.

By way of example, it may be an area for uptake by wetting. Specifically, the uptake area may consist of a support material that is arranged in a given manner on the said active surface or on the substrate, and which, if necessary, may be chemically modified to make it wetting with respect to the liquid of interest, for example by grafting thereon a chemical function that is wetting with respect to the said liquid of interest.

For example, this support material may consist of a material chosen from the group consisting of silicon, silicon oxide ($SiO_2$); glass; silicon nitride ($Si_3N_4$); polymers, for example organic polymers such as those chosen from the group comprising polycarbonates, polydimethylsiloxanes, polymethyl methacrylates, polychlorobiphenyls and cycloolefin copolymers; and of a metal or of a metal or a metal alloy, for example chosen from Al, Au and stainless steel.

For example, the chemical function that is wetting with respect to an aqueous liquid of interest may be chosen from the group consisting of an alcohol, alkoxide, carboxylic acid, carboxylate, sulfonic acid, sulfonate, oxyamine, hydrazine, amine or ammonium function.

For example, the process described in document [9] or [10] may be used to manufacture this type of uptake area.

Also by way of example, in particular when the process of the invention is intended for distributing drops of aqueous liquid of interest, and when the active surface or the substrate is based on silicon, the uptake area may consist of hydrophilic black silicon, which may be formed very easily on such a surface by etching. The etched area becomes particularly wetting with respect to an aqueous liquid of interest. The etched area does not require any other chemical modification in order to be wetting with respect to aqueous solutions. This embodiment example is thus very economical. For example, document [11] outlines a laboratory protocol that may be used to manufacture uptake areas of this type.

Also by way of example, the uptake area may be an electrode for uptake by wetting. According to this example, the uptake area, in this case an electrode, may consist, for example, of a material chosen from the group consisting of noble metals, for example Au, Pt, Pd, Ti, Ni, Al, etc., or an alloy of noble metals; carbon; graphite; and indium tin oxide (ITO); the said material being made wetting by electrodeposition thereon of an electrically conductive polymer onto which is attached a chemical function that is wetting with respect to the liquid of interest. The electrically conductive polymer may be one of the polymers used in the manufacture of the lab-on-chips. It may be chosen, for example, from the group consisting of polypyrrole, polyaniline, polyazulene, a polythiophene, polyindole, polyfuran or polyfluorene. The wetting chemical function may, for example, be one of the wetting chemical functions mentioned above. Its attachment to the monomer before polymerization or to the polymer once it is formed may be performed via the standard techniques of chemistry. An example of a process for manufacturing this type of uptake area that may be used to implement the process of the present invention may be found in document [4].

Also by way of example, the uptake area may be an area for the uptake of a drop of liquid of the interest by capillary forces. It may be, for example, an etching of, or a protrusion on, the active surface that makes it possible to take up the drop by capillary forces. These etchings or protrusions may be made, for example, by direct etching of the substrate; by deposition of a material on the surface of a flat substrate, for example by coating, evaporation, spraying, or electrochemical deposition, followed by etching in conjunction with a standard photolithography process, for example by resin coating, insulation and definition of patterns, or etching; by direct definition of patterns via photolithography in photosensitive polymers, for example in the case of photosensitive resins; moulding or drawing of plastic materials. These processes are known to those skilled in the art. The essential is that these etchings or protrusions that form these uptake areas should make it possible to take up, in a localized manner, by capillary action, a drop of the liquid of interest.

Figure 11:
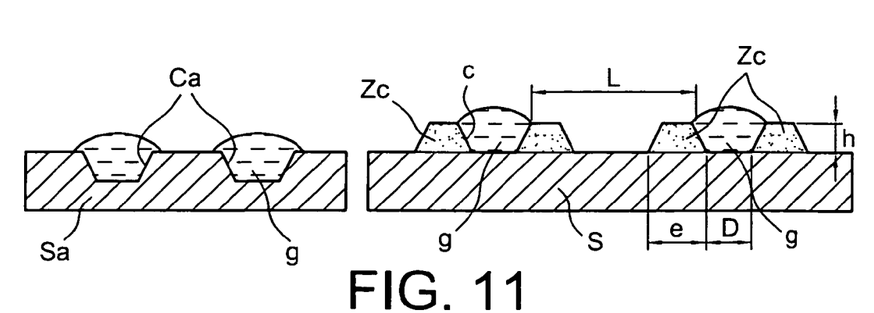
FIG. 11 is a diagrammatic representation in cross section of two types of cuvette: on the left are the cuvettes of the prior art, and on the right are the cuvettes in accordance with the present invention.

Also by way of example, the uptake areas may be in cuvette form on the substrate, or in the form of protrusions, constructed so as to form edges on the said active surface. Preferably, the edges do not touch each other, they have no common edge, and they each form a cuvette on the surface of the substrate intended to take up a drop of the liquid of interest. The appended FIG. 11 is a diagrammatic representation in cross section of two types of cuvette that may be used in the process of the invention: on the left are cuvettes ($c_s$) "sunk" into a substrate ($S_a$), and on the right are cuvettes (c) formed by means of their edge (b) on a substrate (S). On the right, a free space remains available between the cuvettes (c) for the flow of the liquid of interest. The manufacture of the edges or cuvettes may be performed, for example, by direct etching of the substrate; deposition of a material on the surface of a flat substrate for example by coating, evaporation, spraying or electrochemical deposition, followed by etching in conjunction with a standard photolithography process, for example by resin coating, insulation and definition of patterns, or etching; direct definition of patterns by photolithography in photosensitive polymers, for example in the case of photosensitive resins; moulding or drawing, for example of plastics or of the substrate forming the active surface. These processes are known to those skilled in the art. They may in particular be formed during the final step of a technique of stacking several layers on the substrate. The lower layers may contain mechanical, optical or electronic actuators or detectors, for example of MEMS or optical MEMS type ("Micro Electro Mechanical System") or alternatively grafted molecules of chemical or biological interest intended to form a working area.

When the said liquid of interest is aqueous, the uptake area is most preferably a hydrophilic area and the active surface that is substantially non-wetting is most preferably hydrophobic. Thus, the uptake (capture) area can take up (capture) the drop of the liquid of interest via interactions of hydrophilic/hydrophobic type with the liquid of interest. In general, the uptake area locally takes up the drop of liquid of interest by means of wettability (chemical or via capillary action) of the uptake area for the liquid of interest that is greater than that of the active surface.

According to the invention, the localized uptake areas, distributed in a given manner on the said active surface, can form a matrix. The term "drop matrix" means a given arrangement of the said drops, without a particular geometrical form of the said arrangement being stipulated. The drop matrix may be round, square, polygonal or even random, the essential factor being that the drops formed are arranged in a localized and determined manner on the surface in accordance with the objective achieved by the present invention. The term "localized" means circumscribed, individualized and separate from the other drops deliberately taken up on the active surface by means of the process of the invention.

According to the invention, the uptake area may have any form, provided that it takes up a drop of the liquid of interest. This area may be chosen, for example, from a ring, star, rectangle, square, triangle or elliptical shape, or a polygon having from 4 to 20 sides, or any other shape that is suitable for implementing the present invention. In general, it is in strip form.

In addition, each uptake area may be arranged with at least one working area (defined below) formed on the said active surface such that this working area is in contact with the drop of the liquid of interest when it is taken up by the said uptake area. Preferably, at least one uptake area has an open or closed ring shape, which encircles the, at least one, working area arranged therewith. Moreover, an area for the uptake of a drop of liquid of interest may encircle several working areas, for example from 2 to 4 or more, provided that, when a drop of the liquid of interest is taken up by the uptake area, this drop at least partly covers all of the working areas that are encircled by this uptake area.

The term "working area" means an area on which physical and/or chemical and/or optical operations may be performed in the drop taken up by the uptake area with which it is arranged. Thus, according to the invention, the, at least one, working area, may be an area of interaction chosen from an area of electrical, chemical, mechanical or optical interaction with the said captured drop of liquid of interest, or an area on which several of these interactions are simultaneously or successively used.

By way of example, the working area may be an area of chemical interaction with the captured drop of liquid of interest, with or without an electrochemical microcell. The working area may comprise, for example, chemical or biological functions or reagents ready to react with a target of these functions or of these reagents that is present in a liquid of interest. This working area may be chosen from those known to those skilled in the art in the field of biochips (chips sold by AGILENT, CIPHERGEN, EUROGENTEC). The difference between the device of the present invention and these chips of the prior art lies especially in the presence of the area for taking up a drop of liquid of interest arranged with the said working area. This working area may be manufactured, for example, by silanization and then immobilization of the biological probe as described, for example, in document [12].

This working area may be, for example, an area functionalized with a chemical molecule ("probe") intended to interact with a target that may be present in a liquid of interest. The chemical molecule ("probe") may be chosen, for example, from the group consisting of molecules bearing a silanol function, organometallic complexes (for example rhodium bonded to chiral phosphines such as BINAP (trademark) or DUPHOS (trademark) participating in hydrogenation reactions, or alternatively ruthenium complexes participating, for example, in unsaturated ketone syntheses) and metal-based catalysts (for example palladium supported on silica or aluminium chloride). The "target" corresponding to each of these chemical functions ("probes") may be chosen, for example, from the group consisting of silanes (for example tri-, di- or monoethoxysilane, or tri-, di- or monochlorosilane), alkenes (for example dehydroamino acids), allylic alcohol derivatives (for example 3-buten-2-ol), chlorinated aromatic compounds (for example mono-, di- or trichlorophenol), or mixtures of aromatic compounds and of halogenated reagents (for example benzene and bromine, or benzene and acetyl chloride).

The working area may comprise, for example, a polymer functionalized with a biological probe such as those mentioned above, for the purpose of attaching a corresponding target liable to be present in a liquid of interest to detect it, for example optically. For example, on a substrate such as those mentioned, this working area may be obtained according to the methods described in document [13].

Also by way of example, according to the invention, the working area may be an area of electrical interaction, for example an electrochemical microcell. An electrochemical microcell is a device containing at least two electrodes, which are preferentially coplanar, forming a working electrode and a counterelectrode. It may also contain a reference electrode. These components are known to those skilled in the art and the manufacturing processes known to those skilled in the art may be used to manufacture this working area, for example the process described in reference document [8]. The working area then constitutes a veritable electrochemical microreactor that uses the drops of liquid of interest taken up by the edges as reaction media, and more specifically as electrochemical media. Each electrochemical reactor (edge+working area in the form of an electrochemical microcell+captured drop of liquid of interest) according to this first embodiment of the present invention may be used to perform any electrochemical reaction and/or analysis known to those skilled in the art.

The process of the invention using these electrochemical reactors may serve, for example, to perform localized electropolymerization reactions of one or more monomer(s)

present in the drop (polymerization or copolymerization) and/or localized electrografting reactions of one or more chemical molecule(s) present in the drop of the liquid of interest on one of the electrodes of the microcell. In this example, the liquid of interest may be a liquid containing the reagents required for the desired electropolymerization or electrografting. The polymerization and the grafting are then advantageously localized on each drop of the liquid of interest taken up by each uptake area. Such localized grafting or electropolymerization reactions may be used, for example, for the manufacture of biochips or analytical systems.

In one particular example of implementation of the process of the invention, the electrochemical microcell may be used first to "manufacture" the working areas, and then, for example, to use these working areas for the analysis of drops of a liquid of interest to be analysed. For example, if the working areas should comprise an organic polymer functionalized with a probe, for example a biological probe, they may be manufactured by electropolymerization of a conductive polymer functionalized with a probe, for example according to the process described in reference document [5]. The particular feature associated with the use of the process of the invention is that the uptake areas are used to take up in a localized manner on each working area a first drop of a first liquid of interest containing the reagents required for the electropolymerization (organic monomer). The functionalization with the probe may be performed simultaneously with the electropolymerization, and the first liquid of interest then also contains the probe (for example monomer functionalized with the probe). The functionalization may also be performed after the electropolymerization by means of a second drop of a second liquid of interest (containing the probe) taken up by the same uptake areas and, as a result, localized on the same working areas. In addition, the working areas thus manufactured may then be dried, and they may serve, again by means of their uptake area that surrounds them, to take up a drop of a third liquid of interest to be analysed, containing a target that interacts with the probe (for example complementary oligonucleotides). A fourth liquid of interest may also be used to analyse (detect and/or assay) the probe/target interaction on the said working areas, and so on.

The electrochemical microreactor that may be used in the process of the invention may serve, for example, also to perform qualitative and/or quantitative electrochemical analyses of analytes present in the drops taken up by the uptake areas. It may also serve, for example, to perform qualitative and/or quantitative electrochemical analyses of a probe/target molecular interaction, the probe being attached to the working areas, and the target being in the captured drops of the liquid of interest.

In one particular example, in which the electrochemical microcell is used to detect a target present in a liquid sample, for example by using an interaction of the target to be detected with a specific probe attached to the working areas, it is possible to electrochemically detect the said interaction, for example with amplification of the signal via enzymatic accumulation in a drop of a liquid of interest, containing an enzymatic substrate, taken up by the uptake area that surrounds each working area. Document [4] outlines an operating protocol that may be used for this type of detection, with the process of the present invention.

The detection of a probe/target interaction on a working area may involve means known to those skilled in the art other than the electrochemical cell, for example one of those outlined in the present description, for example an optical process. The electrochemical microcell may thus serve in this case solely to "manufacture" the working areas, the detection of a probe/target interaction then being performed via another means, or alternatively to analyse a probe/target interaction, the manufacture of the working areas being performed via another process, for example one of those known to those skilled in the art in the field of biochips.

In general, according to the invention, when a probe is used on the working areas, it may be chosen, for example, from the group consisting of an enzyme, an enzyme substrate, an oligonucleotide, an oligonucleoside, a protein, a membrane receptor of a eukaryotic or prokaryotic cell, an antibody, an antigen, a hormone, a metabolite of a living organism, a toxin of a living organism, polynucleotide, polynucleoside, complementary DNA, or a mixture thereof. Needless to say, it is chosen as a function of the target with which it is to interact.

Also by way of example, the working area may contain active or measuring devices, such as sensors or actuators. These devices may be added to the abovementioned working areas, or may be exclusive depending on the objective targeted in the implementation of the present invention. The active or measuring devices are advantageously located at the centre of the uptake areas. When the working area comprises a sensor, it may be chosen, for example, from the group consisting of electrical, magnetic, electrostatic, mechanical (for example pressure sensor), thermal (for example temperature sensors), optical (for example optical detection device) and chemical sensors. When the working area comprises an actuator, it may be chosen, for example, from the group consisting of optical (light source), electrical, magnetic, electrostatic, mechanical (mechanical displacement), thermal (heating resistor) and chemical actuators. Such sensors and actuators, which may be used for the implementation of the present invention, and also the process for manufacturing them are known to those skilled in the art, especially in the field of lab-on-chips.

For the implementation of the process of the invention, the, at least one, working area may be an area that is substantially non-wetting or wetting with respect to the liquid of interest. The inventors have in fact noted in the course of their experiments that the wettability of the working area is not a deciding factor for the functioning of the process of the present invention. Specifically, they have observed, entirely unexpectedly, that the process of the present invention can also function when the working area is non-wetting with respect to the liquid of interest, provided that the drop taken up at least partly covers the said working area.

The dimensions of an uptake area (capture) may vary widely as a function of the use for which it is intended and of its nature (type of uptake area, one or more working areas per uptake area, one or more working areas on the active surface, etc.) For example, for a lab-on-chip or a microsystem, the uptake area may have a diameter ranging from 5 μm to 5 mm. When the uptake area is in strip form, this strip may be from 1 to 500 μm wide and may have a thickness relative to the active surface of from 0 to 500 μm. The working area, the size of which depends especially on the uptake area (the drop taken up needing to at least partially cover this working area) may have, for example with the abovementioned dimensions of the uptake area, a diameter such that it touches or does not touch the uptake area surrounding it. For example, the working area may have a diameter of from 5 μm to 5 mm.

According to the invention, the active surface may also be defined in the following manner when the uptake area is in the form of an edge (see FIG. 11 as a guide for the references):

D: inside diameter of the drops, with, for example, 15 μm$\leq$D$\leq$5 mm

L: space between drops;

e: cross section of the thickest wall, with, for example, 20 µm≦e≦100 µm; and h: height of the wall, with, for example, 5 µm≦h≦20 µm; with h/D<0.15; e/D<0.33; and h/L<0.3.

Thus, by way of example, the edges are advantageously in the form of a ring, optionally with one of the abovementioned geometrical forms, the height (h) of which from the active surface is from 5 to 20 µm; the cross section (e) of the ring of which at the active surface is from 20 to 100 µm; and the diameter (D) inside the edge of which, delimiting the working area, is from 15 µm to 5 mm.

In the field of lab-on-chips and microtechnology, in which the characteristic size of the uptake areas is close to 100 µm, the orientation of the box is irrelevant since the gravitational forces become negligible in the face of the forces of uptake of the drop by the uptake areas derived from short-range interactions. On the other hand, for applications targeting larger size scales for the implementation of the present invention, the box used is, of course, preferentially placed horizontally with structuring of the active surface to form the uptake and working areas towards the top.

The process of the present invention may be represented schematically in two steps in the following manner:

total or partial filling of the box, or fluid chamber, with the liquid of interest so as to cover the uptake area(s), and then extraction of the liquid from the box.

Only the uptake area(s) each retain a drop of the liquid of interest, the active surface being non-wetting.

The implementation of the process of the present invention in its various applications may thus successively involve an operation that proceeds collectively, followed by individual operations on each of the drops formed. Thus, in a first operation, referred to as a collective operation, the process of the invention allows the passage of a fluid vein of the liquid of interest, for example injected into the said box, with a matrix of drops, or microvolumes, which are independent from each other. Next, detection processes and/or chemical or biochemical reactions known to those skilled in the art may be performed individually (individual operation), in parallel or successively, in each of the drops taken up by the uptake areas to detect and analyse targets present in the liquid of interest.

Thus, the present invention also relates to the use of the process of the invention in lab-on-chips and Microsystems for chemistry or biology, for example for the analysis and/or detection of target analytes present in a liquid of interest to be analysed. The lab-on-chips and microsystems may themselves be obtained by implementing the process of the invention, as is apparent to a person skilled in the art on reading the present description.

The present invention also relates to a process for detecting at least one molecule that may be present in a liquid of interest, the said process comprising the following steps:

localized distribution of drops of liquid of interest on an active surface in a box according to the process of the present invention, and electrochemical detection in the said drops of the, at least one, molecule that may be present.

The box used in this process comprises a substrate, an active surface, uptake areas arranged with working areas which are electrochemical microcells. The substrate, the structuring to form the working area, the treatment of the surface of the substrate intended to make it substantially non-wetting, and the structuring of the surface intended to form the area for uptake of a drop of the liquid of interest are defined above.

The present invention also relates to a process for the optical detection of at least one molecule that may be present in a liquid of interest, the said process comprising the following steps:

localized distribution of drops of the liquid of interest on an active surface in a box according to the process of the present invention, and detection in the said box, in at least one of the said drops, of the, at least one, molecule that may be present by means of an optical detector.

The box used in this process comprises a substrate, an active surface, uptake areas arranged with working areas, the latter areas being optical detectors. The substrate, the structuring to form the working area, the optical detector, the treatment of the surface of the substrate intended to make it substantially non-wetting, and the structuring of the surface intended to form the area for uptake of a drop of the liquid of interest are defined above.

The optical detection may be performed after carrying out an electrochemical reaction in the drops taken up (when the working areas comprise, in addition to the optical detector, an electrochemical cell), or a chemical or biochemical reaction in the drop taken up (for example an enzymatic reaction demonstrating a probe/target interaction on the working area covered with the drop of the liquid of interest).

According to the invention, detections of various molecules that may be present in the liquid of interest may be performed in parallel, simultaneously or successively, in different drops of liquid of interest captive on the said active surface in the box.

According to the invention, the, at least one, analyte to be detected may be chosen, for example, from biological or chemical molecules. The biological molecules may be chosen, for example, from the group consisting of an enzyme, an enzyme substrate, an oligonucleotide, an oligonucleoside, a protein, a membrane receptor of a eukaryotic or prokaryotic cell, a virus, an antibody, an antigen, a hormone, a metabolite of a live organism, a toxin of a live organism, a nucleotide, a nucleoside or a complementary DNA. The chemical molecule may be any molecule that is to be qualitatively and/or quantitatively analysed.

According to the invention, detections of various analytes that may be present in the liquid of interest may be performed in parallel, simultaneously or successively, in different drops of liquid of interest captive on the said active surface in the box.

The present invention also relates to a process for the electropolymerization of molecules present in a liquid of interest, the said process comprising the following steps:

localized distribution of drops of the liquid of interest on an active surface in a box according to the process of the invention, and electropolymerization in the said box, in the drops of the said liquid of interest, of the molecules to be polymerized.

The box used in this process comprises a substrate, an active surface, uptake areas arranged with working areas, the latter areas being electrochemical microcells. The substrate, the structuring to form this working area, the treatment of the surface of the substrate intended to make it substantially non-wetting, and the structuring of the surface intended to form the area for uptake of a drop of the liquid of interest are defined above. The polymer may be, for example, any of the polymers used for the manufacture of biochips, for example polypyrrole, polyaniline, polyazulene, a polythiophene, polyindole, polyfuran or polyfluorene.

A main subject of the invention is thus a process for forming a matrix with a high density of drops of a liquid of interest on a surface, in a fluid chamber (box), which is preferably closed, with only fluid connections. It is therefore not necessary to use an external system (drop-distributing device) for dispensing drops. The process of the invention makes it possible to produce such a drop matrix very easily and very quickly, and at very low cost (no drop-distributing apparatus). All the possible applications of the process of the invention benefit from these advantages.

The most basic application of the process of the invention is the manufacture of lab-on-chips or analytical Microsystems. Specifically, the liquid of interest may comprise all the chemical components required for the manufacture of labs and Microsystems, for example a monomer for its localized polymerization at the site of each drop on the active surface, such a monomer functionalized with a probe, a probe to be attached to a polymer in a localized manner at the site of each drop of the liquid of interest, chemical and/or biochemical reagents to be deposited in a localized manner on a surface, markers, etc.

In multi-step chemical or biochemical processes, and/or analytical processes, using the process of the invention, it is not necessary for all of the steps to lead to the formation of drops. Specifically, there is nothing to prevent certain steps from being performed by covering all of the uptake areas with a liquid and then by emptying the box of this liquid such that no drops captive by the uptake areas remain (for example by injecting a pressurized gas into the box or by vigorous stirring, etc.).

It is moreover possible to successively take up different drops of one or more liquids of interest on the same working area by means of the uptake area surrounding it. Each liquid of interest may contain one or more reagent(s) required, for example, to perform one of the steps of a chemical or biochemical process, for example to manufacture the working areas and/or to perform analyses. The succession of the various drops on the same working area makes it possible, for example, to perform different successive steps of a process performed by means of the process of the invention on the working areas surrounded with their uptake area. These process steps as a whole are thus advantageously localized on the working areas.

This invention may be applied in very varied fields. Thus, microsystems for chemistry and biology, commonly known as lab-on-chips (LOC) or total analysis Microsystems (μTAS), may benefit from this invention for all the cases in which it is necessary to work with high site densities on a surface and to perform in two stages a collective step, and then an individual step. For example, DNA or protein chips are concerned by this invention. In addition, this invention may be applied anywhere in which it is necessary to form controlled matrices of drops or of products: localized drying of pharmaceutical products, formation of coloured spots, localized grafting of molecules to be qualitatively and/or quantitatively analysed. Moreover, this novel process makes it possible to work at very low volume and thus to envisage applications in which it is necessary to be economical with reagents: for example homogeneous catalysis, high value-added molecules of pharmaceutical chemistry.

Other characteristics and advantages of the invention will also emerge to those skilled in the art on reading the examples that follow, which are given as non-limiting illustrations with reference to the appended figures.

BRIEF DESCRIPTION OF THE FIGURES

FIGS. 5, 6 and 7a) to 7c) diagrammatically represent various forms of uptake areas that may be used for the implementation of the process of the present invention, especially when these areas surround a working area.

FIGS. 9a) and 9b) are two photographs illustrating the implementation of the process of the invention on a device in which the working area is an electrochemical microcell: FIG. 9a) before uptake of a drop of the liquid of interest, and FIG. 9b) after uptake of a drop of the liquid of interest.

EXAMPLES

In these examples, the structuring of the substrate to form the areas for the uptake of drops of the liquid of interest is generally ring-shaped, so as to free a working area at the centre of each uptake area.

Example 1

Example of Manufacture of an Active Surface that is Non-wetting with Respect to an Aqueous Liquid of Interest A silicon (Si) substrate with a 300 nm upper layer of silicon oxide ($SiO_2$) is treated with a hydrophobic silane (1H,1H,2H,2H-perfluorodecyltrichlorosilane) to make the surface hydrophobic.

The protocol is as follows: after treatment in a 3.5 M sodium hydroxide/water/ethanol mixture for 2 hours at room temperature to generate the silanol sites, the substrate is placed for 10 minutes at room temperature in an anhydrous toluene/hydrophobic silane mixture with a 9 mM concentration of silane. It is then washed with toluene, then with acetone and then with ethanol and finally cleaned by sonication for 5 minutes in ethanol. The substrate is then placed in an oven for 1 hour at 110° C. The contact angle measured with water is 110°.

Example 2

Manufacture of an Uptake Area Consisting of a Support Material Placed on the Active Surface that may be used for the Implementation of the Process of the Invention On an Si substrate with a 300 nm layer of $SiO_2$, steps that are standard for the man skilled in the art of microelectronics are performed:
- deposition of 300 nm of platinum (Pt) by spraying;
- photolithography in a photosensitive resin with opening of a circular pattern connected to a current inlet strip;
- in a plasma reactor, total ionic etching of the Pt in the areas without resin;
- removal of the resin in a bath of nitric acid
- in a plasma reactor, chemical vapour-phase deposition of 500 nm of $SiO_2$;
- photolithography in a photosensitive resin with opening of the circular pattern;
- in a plasma reactor, total ionic etching of 500 nm of $SiO_2$ in the areas without resin; and
- removal of the resin in a bath of nitric acid.

Figure 7:
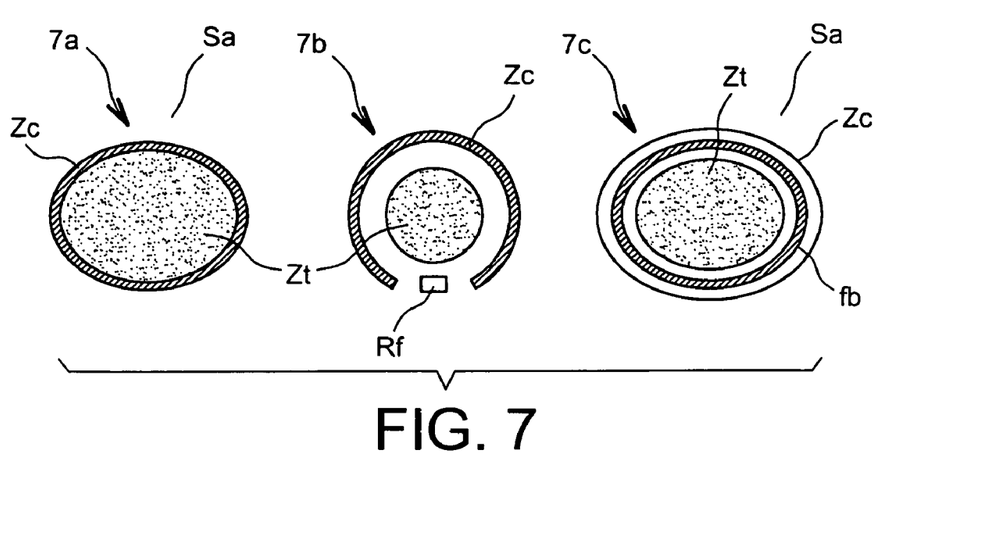

FIG. 7a is a diagrammatic representation of a circular uptake area consisting of a support material and surrounding a working area obtained.

Example 3

Manufacture of an Uptake ("Capture") Area Consisting of Black Silicon, which may be used for the Implementation of the Process of the Invention On an Si substrate (all these steps are very well known to the man skilled in the art of microelectronics):
- photolithography in a photosensitive resin with opening of a crown-shaped pattern;
- in a plasma reactor, ionic reactive etching of about 3 μm of silicon according to the protocol described in document [11] to form black silicon;
- cleaning of the surface at the end of etching by treatment in a Plassys MDS 150 plasma reactor (from the Plassis, France) under the following conditions: power 500 W, reaction time 4 minutes, pressure 21.33 Pa (160 mTorr), oxygen flow rate 25 $cm^3$/min., room temperature; and
- removal of the resin in a bath of nitric acid.

The black silicon formed on these given areas is highly hydrophilic, whereas the silicon is substantially non-wetting with respect to the aqueous liquids of interest (samples).

Figure 5:
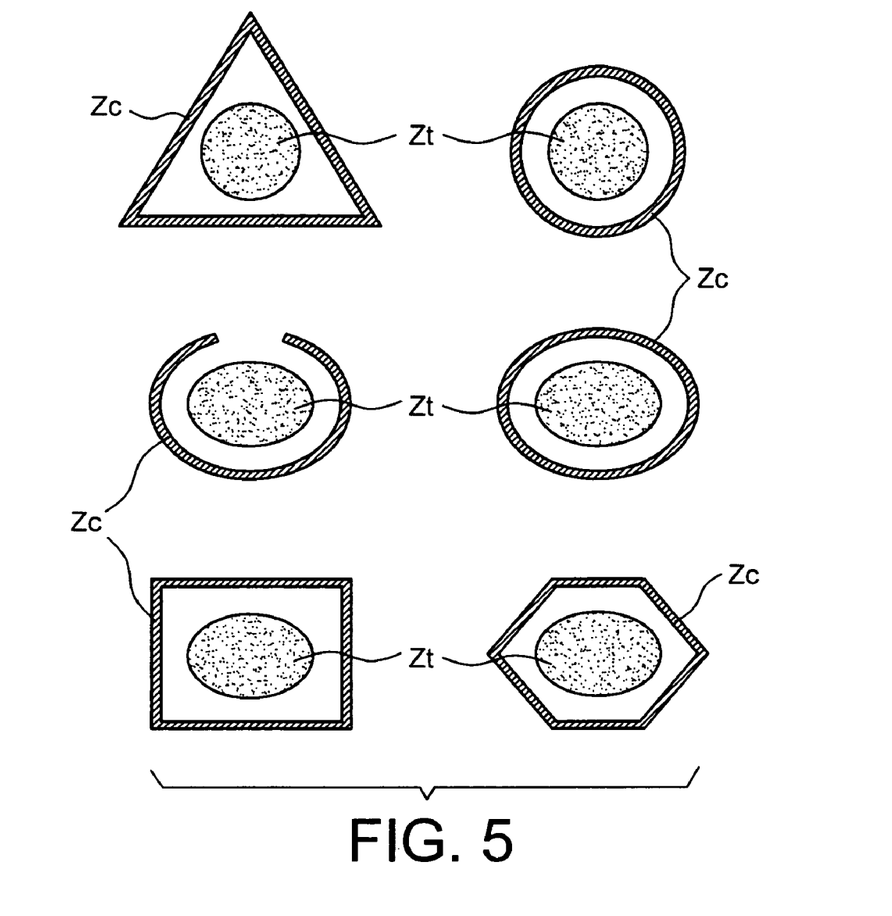
Figure 6:
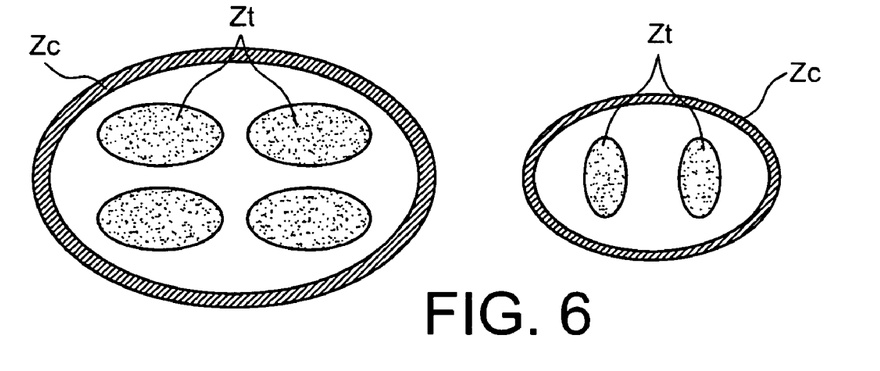

FIGS. 5 and 6 diagrammatically show various uptake areas formed around their working area(s). The fine structuring was produced so as to create a strip of black silicon, open or closed, which constitutes the uptake area (Zc), around an area intended to form the working area (Zt). In FIG. 6, an uptake area is provided around two (on the right) or four (on the left) working areas.

The etched area does not require any other chemical modification. This device of the invention is intended to be used with aqueous liquids of interest.

Example 4

Manufacture of an Uptake Area in the Form of an Electrode for Uptake by Wetting, Which may be Used for the Implementation of the Process of the Invention 4.1 Uptake Area in the Form of an Uptake Electrode:

On an Si substrate with a 300 nm layer of $SiO_2$, the following steps are performed:

α) The same steps as in Example 2 are performed to provide an electrode (support material) on the active surface;

β) preparation of the active surface that is non-wetting with respect to the liquid of interest on all of the substrate to make it hydrophobic as in Example 1. The electrode is then chemically cleaned with a solution of sodium hydroxide/water/ethanol. To do this, a drop of a 3.5 M sodium hydroxide/water/ethanol mixture is placed on the electrodes for 2 hours at room temperature. The electrodes are then washed with water and then dried;

γ) in additional experiments, a hydrophilic barrier was made on the electrode by electropolymerization under potentiostatic conditions of a pyrrole bearing alcohol functions (functions that are wetting with respect to an aqueous liquid of interest) in position 3. This polypyrrole is generated from a 100 mM solution of pyrrole-3-ethanol and 0.5 M lithium perchlorate ($LiClO_4$). A 1 V potential vs Ag/AgCl/Cl⁻ is applied for 5 seconds. The contact angle measured with water on the electrode is 53°.

FIG. 7a is a diagrammatic representation of a device according to the invention obtained using the protocol of this example. In this figure, the uptake area (Zc), surrounding the working area (Zt), is formed by an electrode covered with a polypyrrole bearing wetting functions (alcohol functions).

4.2 Uptake Area in the Form of a Wetting Strip

On an Si substrate with a 300 nm layer of $SiO_2$, the following steps were performed:

α) preparation of the active surface that is non-wetting with respect to a liquid of interest on all of the substrate to make it hydrophobic, as in Example 1.

β) photolithography in a photosensitive resin of negative type (reference NFR-015 from the supplier Shipley) with an opening of a crown-shaped pattern, to form the uptake area (or wetting strip);

γ) destruction of the hydrophobic silane in the open patterns of the photosensitive resin by treatment in a Plassys MDS 150 plasma reactor (from the company Plassys, France) under the following conditions: power 500 W, reaction time 4 minutes, pressure 21.33 Pa (160 mTorr), oxygen flow rate 25 $cm^3$/min., room temperature; and δ) preparation of the uptake area by silanization with a silane bearing amine functions (functions that are wetting for the aqueous liquid of interest). The substrate is placed in a solution containing 10% by volume of γ-aminopropyltriethoxysilane in ethanol. After leaving overnight at room temperature, the substrate is washed with ethanol and finally left for three hours in an oven at 110° C.

Example 5

Manufacture of Uptake Areas Consisting of Edges that may be Used for the Implementation of the Process of the Invention On a new silicon wafer, a step of photolithography is performed with a thick photosensitive resin Clariant AZ4562 (trademark) in the following manner:

- deposition of an adhesion promoter, which in this case is hexamethylenedisilazane, in an oven at 120° C.,
- coating with resin on a spin coater at 1000 rpm for 30 seconds with an acceleration of 200 rpm/s,
- annealing on a hotplate at 115° C. for 2 minutes,
- insulation on a Karl Süss MA750 (trademark) insulating machine for 50 seconds in batch mode (5×10 seconds with 5-second pauses) through a mask,
- development in a Shipley MF319 (trademark) solution diluted in proportions of 1:3 with deionized water,
- rinsing with deionized water and drying under a flow of nitrogen,
- annealing on a hotplate at 115° C. for 3 minutes, and then at 150° C. for 1 minute,
- measurement of the thickness: 13 μm.

On the mask used for the insulation, all the patterns represent rings whose walls are 35 μm wide with various combinations between their diameter (100 to 1000 μm) and the inter-centre distance between two edges (crowns) (50 to 1000 μm).

3025 cuvettes (c) on an area of 1 cm$^2$ were easily obtained.

FIG. 11, on the right, diagrammatically represents the uptake areas (Zc) obtained, in the form of edges. These uptake areas form cuvettes (c) capable of taking up a drop (g) of a liquid of interest.

Example 6

Manufacture of Working Areas Functionalized with a Probe, which may be Used in the Process of the Invention In this example, a working area comprising four electrodes is manufactured and used. On an Si substrate with a 300 nm layer of SiO$_2$, steps that are standard for the man skilled in the art of microelectronics are performed

- deposition of 300 nm of platinum (Pt) by spraying;
- photolithography in a photosensitive resin with opening of the patterns of the microcell, of the uptake electrode and of the current inlet strips;
- in a plasma reactor, total ionic etching of the Pt in the areas without resin;
- removal of the resin in a bath of nitric acid
- in a plasma reactor, chemical vapour-phase deposition of 500 nm of SiO$_2$;
- photolithography in a photosensitive resin with opening of the patterns of the electrodes of the microcell and of the uptake electrode
- in a plasma reactor, total ionic etching of 500 nm of SiO$_2$ in the areas without resin; and
- removal of the resin in a bath of nitric acid.

The working electrode (We) (see FIG. 8), the counterelectrode (CE) and the annex electrode used to form the uptake area (Zc) are made of platinum (about 5000 Å deposit). An Ag/AgCl/Cl$^-$ reference electrode (Rf) is also present (see FIG. 8).

An Ag/AgCl/Cl$^-$ reference electrode (Rf) is also present. This electrode is obtained by depositing silver onto the platinum according to the following protocol:

- preparation of a 10 ml solution containing 0.2 M AgNO$_3$, 2 M KI, 0.5 mM Na$_2$S$_2$O$_3$;
- a potential of −0.65 V vs SCE (saturated calomel electrode) is imposed for 90 seconds (followed by chronoamperometry) on the reference electrode. A grey/white deposit is obtained. The working area is then rinsed with water; and
- the working area with the modified electrode above is immersed in 0.1 M HCl solution and a potential of 0.5 V vs SCE is imposed for 30 seconds to chlorinate the silver deposit.

The substrate is then rinsed with water.

Each working area was entirely silanized with a hydrophobic silane according to the protocol described in Example 1.

The hydrophilic barrier is produced on the uptake electrode according to the protocol described in Example 4.1-δ.

The counterelectrode (CE) is then functionalized with a pyrrole/pyrrole conductive copolymer functionalized in position 1 with the biological function (in this case an oligonucleotide probe) [5]. The electropolymerization is localized on the counterelectrode of the working area.

Figure 9:
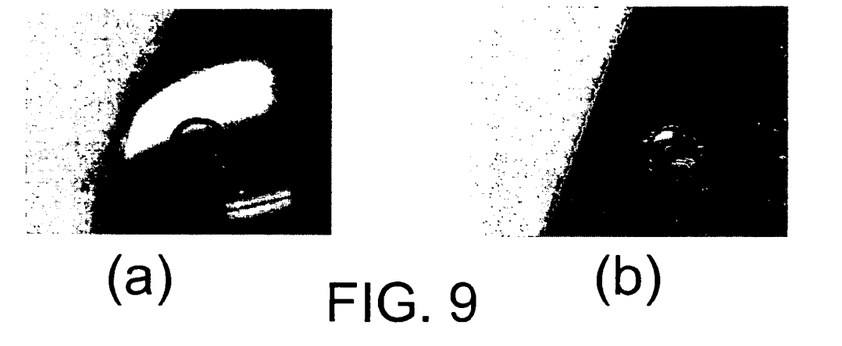

To test this working area, the oligonucleotide probe is hydribized with a target oligonucleotide (100 μM) bearing an enzymatic marker (HRP "Horseradish Peroxidase") in a buffer (1 M NaCl/10 mM Tris/1 mM EDTA/0.05% Triton X100). After washing in the same buffer but without Triton, the developing solution (OPD+H$_2$O$_2$+50 mM phosphate-citrate buffer) is introduced onto the device of the present invention and then removed by suction. A fraction of liquids is indeed left in a localized manner on the working area, as shown by the photographs of FIG. 9:

- on the left, before the device is covered with the developing solution, the device of the present invention without the drop is distinguished; and
- on the right, after the developing solution has been removed by suction, the device of the present invention that has taken up, by means of its uptake area (hydrophilic strip), a drop of the developing solution, is distinguished.

Figure 10:
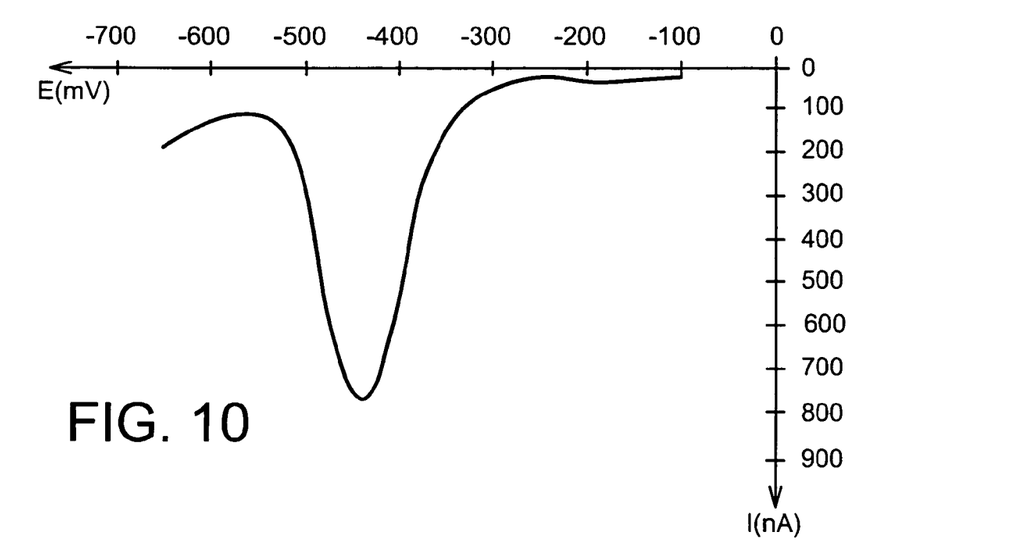
FIG. 10 is a graph showing the detection, on a working area, of a product of an enzymatic reaction in a drop taken up by the implementation of the present invention.

After developing for 5 minutes, the enzymatic product is detected by differential pulsed voltamperometry on the measuring electrode (WE). The results of this detection are represented by the graph in the appended FIG. 10.

Figure 8:
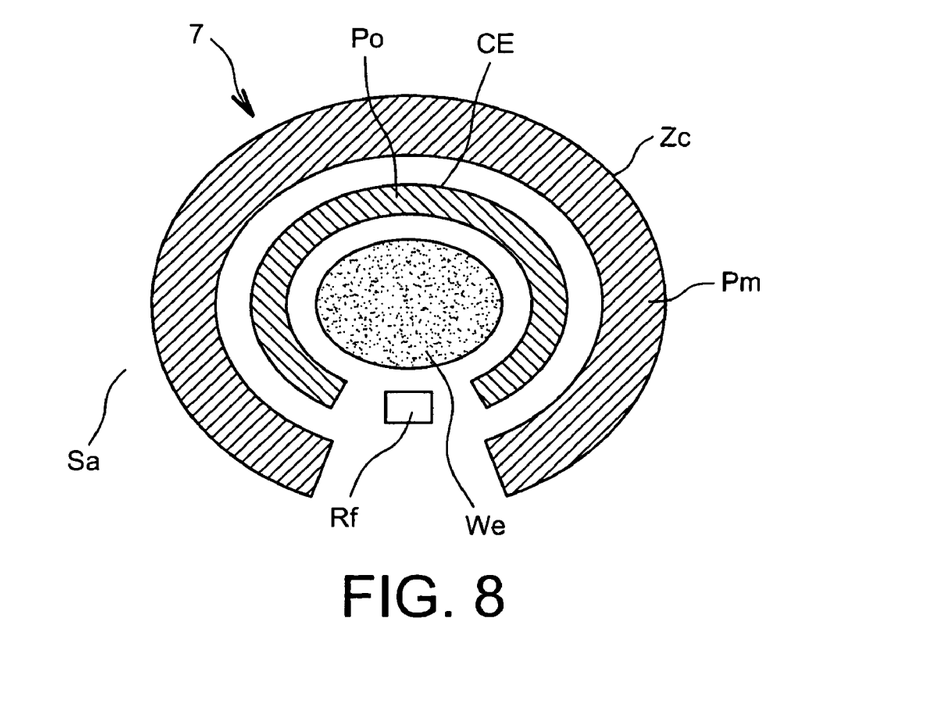
FIG. 8 diagrammatically represents a device that may be used for the implementation of the process of the invention, in which the working area is an electrochemical microsystem.

FIG. 8 is a diagrammatic representation of an electrochemical microcell of a device according to the invention obtained by using the protocol of this example. In this figure, the working area consists of the measuring electrode or working electrode (WE), the conductive polymer bearing the oligonucleotide (Po) deposited on the counterelectrode (CE), and the uptake area (Zc) formed by the outermost electrode on which the polymer bearing alcohol functions has been deposited (Pm). The whole is produced on the non-wetting active surface (Sa).

Example 7

Manufacture of a Box Suitable for Implementing the Process of the Invention

A hollow polydimethylsiloxane (PDMS) lid is manufactured by moulding on a glass mould with a 1 mm square overthickness pattern.

On a flat device of the present invention like those obtained in the previous examples, this hollow lid is attached in a leaktight manner by bonding with crosslinking adhesive by insulation with ultraviolet rays (VITRALIT 6181). The connections for the fluid inlets and outlets are made by piercing the lid with small-diameter needles. The entry needle is connected to fluid transportation tubes and to a syringe full of the liquid of interest. The final assembly is tested to detect any leaks, given that the liquid should pass only via the connections provided for this purpose.

Figure 3:
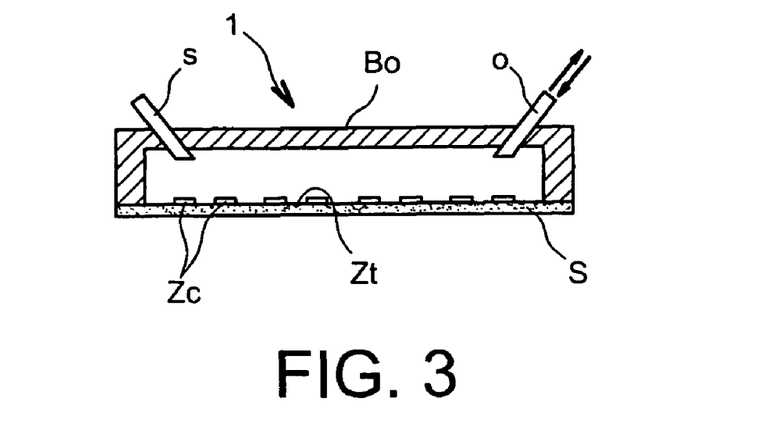
FIG. 3 is a scheme representing in cross section a device that may be used for the implementation of the process of the invention, in which the means for introducing the liquid of interest into the closed box and for extracting the liquid of interest from the box use the same aperture on this box.

FIG. 3 is a diagrammatic representation of the box obtained in this example.

Figure 2:
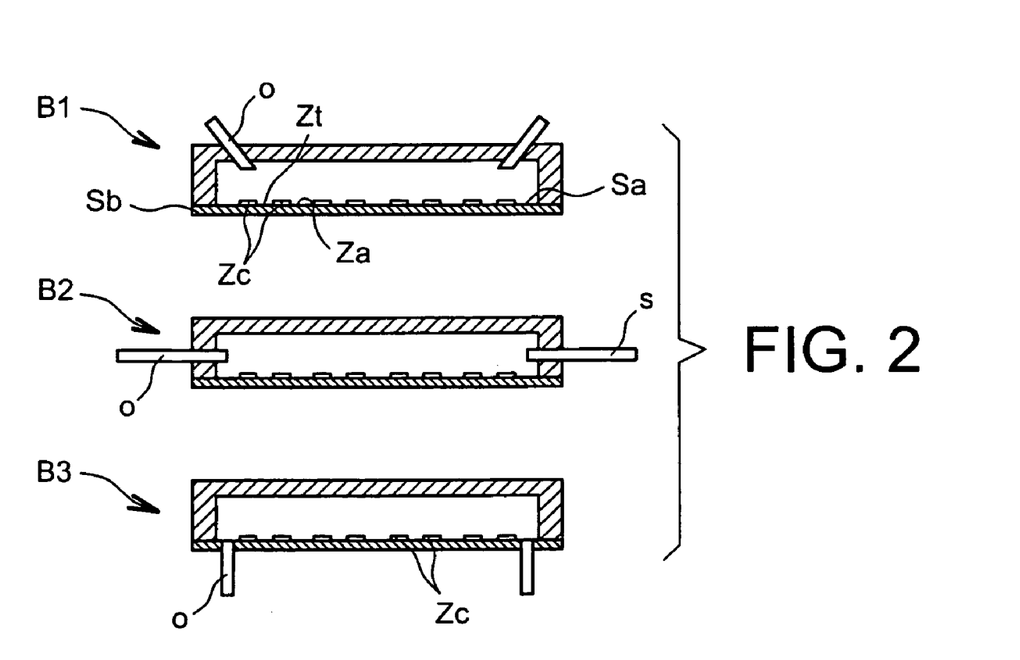
FIG. 2 is a diagrammatic representation of various possible embodiments of the process of the invention using different closed boxes, which differ especially in the arrangement of the apertures for the entry and exit of the liquid of interest.

Other arrangements of the inlet and outlet connections may readily be made, and FIG. 2 provides diagrammatic representations of various boxes. In this figure, B1, B2 and B3 represent three types of box according to the invention with differently placed inlet (o) and outlet (s) apertures. Sb, Sa, Zc and Zt have the same meaning as in the abovementioned figures. The various components that constitute the box of the invention are represented in the same manner on the three schemes.

Figure 4:
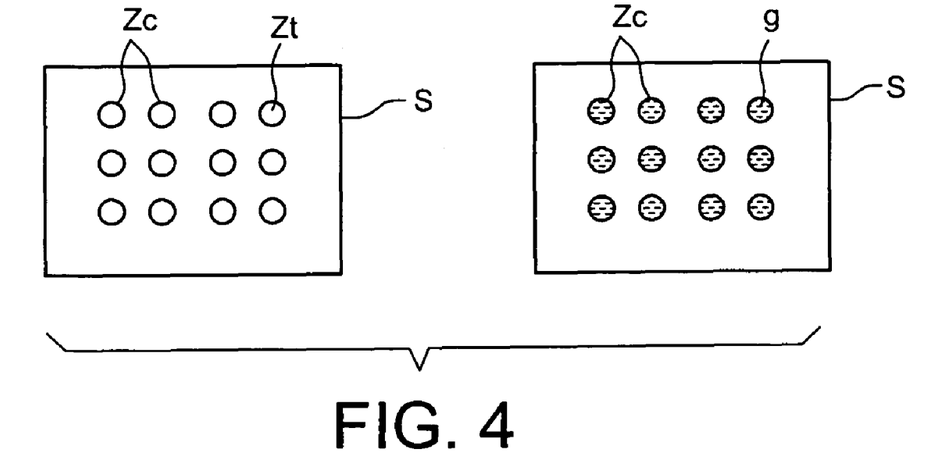
FIG. 4 is a scheme in top view, produced from experimental photographs, of an active surface (S), on which a matrix of drops is formed by using the process of the present invention: on the left is the surface without drops before implementing this process, and on the right is the surface with the matrix of drops (g) retained by the uptake areas (Zc) when the liquid of interest has been extracted from the box, in the final step of the process of the invention.

FIG. 4 is a diagrammatic representation in top view of an active surface used to manufacture a box according to the invention. This active surface comprises 12 uptake areas and 12 corresponding working areas. The active surface is non-wetting with respect to the substrate. Various forms of uptake area that may be used for the implementation of the process of the invention were manufactured, in particular ring-shaped or disc-shaped uptake areas. They are represented in FIGS. 5 and 6.

Example 8

Implementation of the Process of the Invention for the Localized Distribution of Drops and Results The implementation of the process of the invention is tested on boxes manufactured according to Example 7 above, with the various uptake areas manufactured according to Examples 2 to 6 above.

Figure 1:
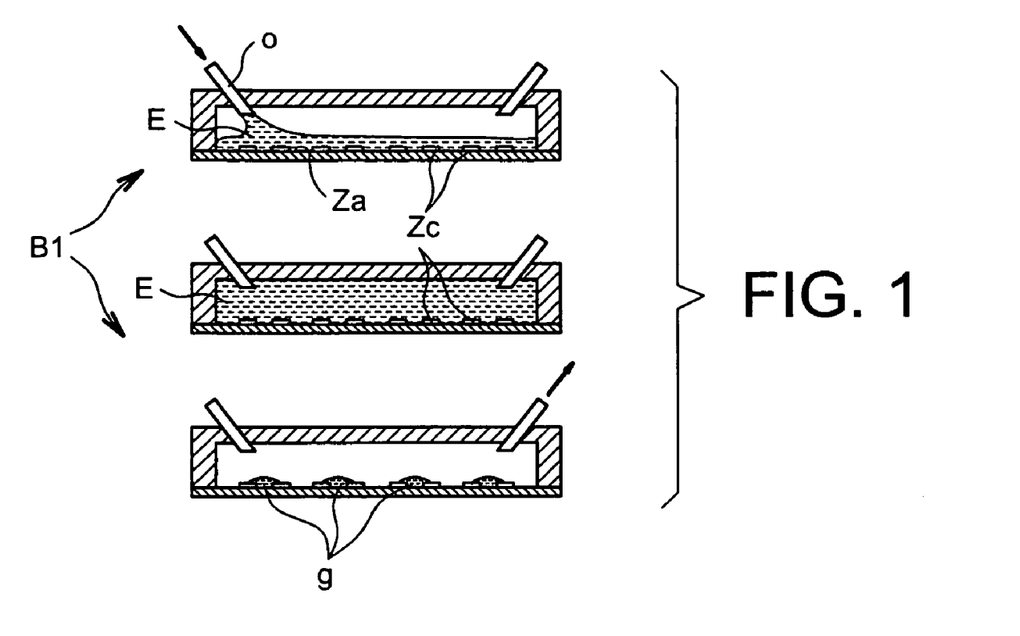
FIG. 1 is a scheme representing in cross section an example of implementation of the process of the present invention for the creation of a drop matrix.

FIG. 1 represents the functioning of a closed box with a first aperture (o) for the introduction of the liquid of interest into the box, and a second aperture (s) for extraction of the liquid of interest from the box: the liquid of interest E is injected into the box (top scheme) via the first aperture (o) until it is full (middle scheme), and is then extracted via the second aperture (s) (bottom scheme). The injection means used is a syringe, and the extraction means used is a syringe. A drop matrix (g) is obtained on the active surface as represented in the appended FIG. 4, by means of the uptake areas (Zc).

FIG. 3 represents the functioning of a closed box with a first aperture (o) for introduction of the liquid of interest into the box and for extraction of the liquid of interest from the box, and a second aperture (s) that allows air contained in the box to exit during the introduction of the liquid of interest therein, and to enter the box during the extraction of the liquid of interest. The liquid of interest E is injected into and then extracted from the box via the one single aperture. A drop matrix (g) is obtained as represented in the appended FIG. 4.

This example shows that a drop matrix (g) clearly localized on the various uptake areas is obtained by means of the process of the present invention. Filling of the box is not obligatory, provided that the various uptake areas are covered with the liquid of interest.

Experiments performed with uptake areas of different forms, such as the forms shown in FIGS. 5 and 6, show that these uptake areas arranged with working areas are also functional for the implementation of the process of the invention.

Example 9

Electrochemical Detection Process

A box is manufactured according to the protocol of Example 7, with uptake areas and working areas manufactured according to Example 6.

The liquid of interest consists of a developing solution comprising the substrate of the enzyme HRP: hydrogen peroxide ($H_2O_2$) and the chromogen OPD (orthophenylenediamine). This solution is introduced into the closed box so as to cover the uptake areas, and is then removed from this box by suction.

Drops of the liquid of interest are clearly taken up by the uptake areas, and cover the working areas, as shown by the photographs in the appended FIG. 9:

on the left, before the active surface is covered with the liquid of interest: the working area without drops is distinguished; and on the right, after the liquid of interest has been removed by suction: the uptake area that has taken up a drop of the liquid of interest is distinguished.

After leaving to stand for 5 minutes, which serves to develop the enzymatic reaction, the enzymatic product is detected by differential pulsed voltamperometry. The results of this detection are represented on the graph in the appended FIG. 10.

The uptake area surrounding the working area is thus indeed functional, and the process of the invention does indeed make it possible to detect an analyte in each captured drop.

Example 10

Electropolymerization Process

A working box is manufactured according to the protocol of Example 7, with uptake areas and working areas manufactured according to Example 6.

As in Example 6 above, a polymerization of functionalized or non-functionalized pyrrole was obtained in a localized manner on the drops taken up by the uptake areas.

LIST OF REFERENCES

[1] WO 02/16023: Protogene Laboratories Inc.
[2] U.S. Pat. No. 6,040,193: Affymetrix Inc.
[3] WO 99/03684: Eapen Saji et al.
[4] Azek et al., *Analytical Biochemistry*, 2000, 284, 107-113.
[5] WO 00/36145: Commissariat à l'Energie Atomique.
[6] WO 02/090573: Infineon
[7] Junghoon Lee et al., "Electrowetting and Electrowetting-on-dielectric for microscale liquid handling", *Sensor and Actuators A* 95 (2002), 259-268.
[8] J. Cooper et al., "Micromachining Sensor for Electrochemical Measurement in Subnanoliter Volumes", *Anal. Chem.* 1997, 69, 253-258.
[9] Mengsu Yang et al., "Covalent Immobilisation of Oligonucleotides on Modified Glass/Silicon Surfaces for Solid-Phase DNA Hybridization and Amplification", *Chemistry Letters* 1998, 257-258.
[10] Mila Boncheva et al., "Design of Oligonucleotide Arrays at Interfaces" *Langmuir* 1999, 15, 4317-4320.
[11] H. Jansen et al., "The black silicon method: a universal method for determining the parameter setting of a fluorine-based reactive ion etcher in deep silicon trench etching with profile control", *J. Micromech. Microeng.* 5 (1995), 115-120.

[12] FR-A-2 818 662.

[13] EP-B-561 722.

The invention claimed is:

1. Process for the localized distribution of drops of a liquid of interest on an active surface of a substrate, the process comprising the following steps:

introduction of the liquid of interest into a box via an introduction means, the box enclosing the active surface, and extraction of the liquid of interest from the box via an extraction means, the active surface and also other surfaces inside the box being substantially non-wetting with respect to the liquid of interest with the exception of several localized uptake areas, formed in a given manner on the active surface, which are each suitable for taking up a drop of the liquid of interest, the means for introducing and for extracting the liquid of interest in the box being arranged such that when the liquid of interest is introduced into the box, the liquid of interest covers the uptake areas, and when the liquid of interest is extracted from the box, a drop of the liquid of interest remains captive in a distributed and localized manner on each uptake area, each uptake area being arranged with at least one working area formed on the active surface such that this working area is in contact with the captive drop of liquid of interest, the at least one working area being an area that is non-wetting with respect to the liquid of interest, at least one uptake area having an open or closed ring shape that encircles the at least one working area arranged therewith.

2. Process according to claim 1, in which the area for uptake of the drop of the liquid of interest encircles several working areas.

3. Process according to claim 1, in which the working area is an area for detection of a chemical species that may be present in the liquid of interest.

4. Process according to claim 3, in which the working area is an area functionalized with a biological probe.

5. Process according to claim 4, in which the probe is chosen from the group consisting of an enzyme, an enzyme substrate, an oligonucleotide, an oligonucleoside, a protein, a membrane receptor of a eukaryotic or prokaryotic cell, an antibody, an antigen, a hormone, a metabolite of a living organism, a toxin of a living organism, a polynucleotide, a polynucleoside or a complementary DNA.

6. Process according to claim 3, in which the working area is an area functionalized with a chemical molecule.

7. Process according to claim 1, in which the working area is an area of electrical and/or chemical interaction with the captive drop.

8. Process according to claim 7, in which the working area is an electrochemical microcell.

9. Process according to claim 1, in which the working area comprises a sensor chosen from the group consisting of optical, electrical, magnetic, electrostatic, mechanical, thermal and chemical sensors.

10. Process according to claim 1, in which the working area comprises an actuator chosen from the group consisting of optical, electrical, magnetic, electrostatic, mechanical, thermal and chemical actuators.

11. Process according to claim 1, in which at least one of the areas for uptake of a drop of the liquid of interest is an electrical or physical uptake area.

12. Process according to claim 11, in which the uptake area takes up the drop of the liquid of interest via capillary forces.

13. Process according to claim 11, in which the uptake area locally takes up the drop of liquid of interest by wetting.

14. Process according to claim 13, in which the uptake area locally takes up the drop of liquid of interest by means of a wettability of the uptake area for the liquid of interest that is greater than that of the active surface.

15. Process according to claim 13, in which the uptake area locally takes up the drop of liquid of interest by electrowetting.

16. Process according to claim 11, in which the uptake area takes up the drop of liquid of interest via interactions of hydrophilic/hydrophobic type with the liquid of interest.

17. Process according to claim 1, in which at least one of the uptake areas is in relief or protrudes relative to the active surface on which it is formed.

18. Process according to claim 1, in which the localized uptake areas, distributed in a given manner on the active surface, form a matrix.

19. Process according to claim 1, in which, the means for extracting the liquid of interest being means for removing it from the box by suction, the extraction step consists in removing the liquid of interest from the box by suction.

20. Process according to claim 1, in which, the means for extracting the liquid of interest being means for injecting a gaseous fluid into the box, the extraction step consists in injecting a gaseous fluid into the box so as to expel the liquid of interest from the box.

21. Process according to claim 20, in which the gaseous fluid injected is saturated with vapour of the liquid of interest.

22. Use of a process according to claim 1 in a lab-on-chip or in a microsystem for chemistry or biology.

23. Use of a process according to claim 1 in a biochip chosen from the group consisting of DNA chips, RNA chips, protein chips, antibody chips, antigen chips and cell chips.

24. Process for detecting at least one molecule that may be present in a liquid of interest, the process comprising the following steps:

localized distribution of drops of liquid of interest on an active surface in a box according to the process of claim 1, and electrochemical detection in the drops of the, at least one, molecule that may be present in the liquid of interest.

25. Process for the optical detection of at least one molecule that may be present in a liquid of interest, the process comprising the following steps:

localized distribution of drops of a liquid of interest on an active surface in a box according to the process of claim 1, and optical detection in the drops of the, at least one, molecule that may be present in the liquid of interest.

26. Process according to claim 24, in which detections of various molecules that may be present in the liquid of interest are performed in parallel in different drops of liquid of interest captive on the active surface in the box.

27. Process for the electropolymerization of molecules present in a liquid of interest, the process comprising the following steps:

localized distribution of drops of liquid of interest on an active surface in a box according to the process of claim 1, and electropolymerization in the box, in the drops of the liquid of interest, of the molecules to be polymerized.

* * * * *